United States Patent [19]
Hjort-Hansen

[11] Patent Number: 5,821,416
[45] Date of Patent: Oct. 13, 1998

[54] DEVICE FOR WEIGHT INDEPENDENT SUPPORT OF OBJECTS

[76] Inventor: Arne Hjort-Hansen, Helgasvej 25, Stilling, DK-8660, Skanderborg, Denmark

[21] Appl. No.: 737,514
[22] PCT Filed: May 9, 1995
[86] PCT No.: PCT/DK95/00183
  § 371 Date: Nov. 12, 1996
  § 102(e) Date: Nov. 12, 1996
[87] PCT Pub. No.: WO95/30617
  PCT Pub. Date: Nov. 16, 1995

[30] Foreign Application Priority Data

May 9, 1994 [DK] Denmark .................................. 0532/94

[51] Int. Cl.⁶ .................................. G01M 1/00; B66F 3/24
[52] U.S. Cl. .................................. 73/487; 254/93 R
[58] Field of Search .................................. 73/487, 484, 485; 254/93 L, 93 R, 124, 2 B, 8 B, 9 B, 10 B, 93 H; 157/14, 16; 92/13.6; 414/428, 427, 426

[56] References Cited

U.S. PATENT DOCUMENTS 3,935,748  2/1976  Lannen ..................................... 73/484
4,021,018  5/1977  Dasan ..................................... 254/93 H
4,763,515  8/1988  Pielach et al. ............................. 73/146
4,979,723  12/1990  Wittersheim ............................. 254/124

*Primary Examiner*—Hezron E. Williams
*Assistant Examiner*—Richard A. Moller
*Attorney, Agent, or Firm*—Sixbey, Friedman, Leedom & Ferguson; David S. Safran

[57] ABSTRACT

It is known that for an easily height displaceable "weightless" support of heavy objects such as car wheels to be mounted on a balancing machine, it is possible to use an air cylinder (22) having a voluminous lower pressure chamber (20) into which compressed air from an inlet valve (36) can be introduced for building up an air spring to equalize the weight of the object, whereby the object can be moved somewhat up and in "weightless" condition. This requires a certain adaptation of the supply of the compressed air, and the invention provides for a device having means for effecting such an adaptation automatically. An inlet valve (36) is used, which is openable by operator actuation when the elevating system (6, 10) assumes its bottom position, while the valve is closed in response to the initial raising of the elevating system (6, 10, 18, 30). The device additionally has easily operated means for a corresponding bleeding of the cylinder, whereby it is possible to make the elevating system depart from its top position.

8 Claims, 1 Drawing Sheet

DEVICE FOR WEIGHT INDEPENDENT SUPPORT OF OBJECTS

BACKGROUND OF THE INVENTION

The present invention relates to a device for temporary supporting of objects in a height adjustable, "weightless" manner, and the invention aims particularly at such devices, which should be usable for carrying objects of different weights. The invention first of all relates to a weightless carrying of car wheels by the mounting of these on the spindle of a wheel balancing machine, where it is important that the wheels be fixed while the weight of the wheel is outbalanced.

This kind of supporting is relatively easily achievable by the use of a working cylinder containing or being connected with a large air volume in a closed space, such that an air cushion can be built up beneath the cylinder piston and, when the air pressure is suitably adjusted, thereby carry an object of a specific weight placed on a carrier platform connected with an upright piston rod of the cylinder. Due to the large air volume the relevant sufficient air pressure will not change essentially if the piston is displaced somewhat up- or downwardly, and for that reason it is possible, by a light touch of the object, to adjust the height position thereof between different self-carried positions within a certain height range, e.g. of 10–30 cm.

Often it will be actual to pick up an object from the floor level and deliver it at almost the same level, and since it will be unpractical to relieve the pressure of the entire system for each change of objects it is preferred to effect the lowering by the aid of pressing means for a compulsory pressing down of the movable system and holding it down even after removal of the heavy object. When a new object with the same or almost the same weight is thereafter placed on the carrier platform, the latter will automatically return up to the weightless area when the pressing means are released. Correspondingly, objects may be received from and delivered to a higher level by way of a compulsory raising to that level and a temporary blocking therein.

If the new object has another weight it will be necessary to change the air pressure correspondingly until the object rises or descends to the relevant level. However, it has been found that this may imply certain difficulties of operation, so it is desirable to provide for an automatic control of the pressure, according to the requirements. There are different straight solutions to this end, but they tend to be complicated, and the invention aims at providing a particularly simple and suitable arrangement.

BRIEF DESCRIPTION OF THE DRAWING

The principles thereof will be apparent from the following description with reference to the drawing, in which.

DESCRIPTION OF THE PREFERRED EMBODIMENT

Figure 1:
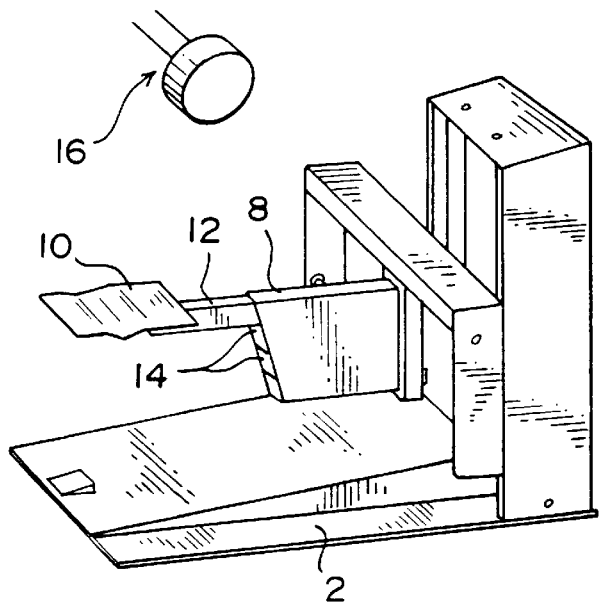
FIG. 1 is a perspective front view of an example of a supporting device according to the invention.

The device shown in FIG. 1 has a base portion 2 having at its rear an upright guiding box portion 4 provided with a rail system for vertical guiding of a frame member 6, which, itself, has transverse guiding means for a horizontal guiding of a projecting carrier member 8 with an outer carrier plate 10. The latter is mounted on an arm 12 which can be introduced into one of several holding openings 14 in the unit 8 for adjusting the working level of the plate 10 in its elevated condition. The job here considered by way of example is to bring a car wheel placed on the plate 10 up to a mounting level next to a spindle 16 of a balancing machine and to thereafter, by lateral displacement of the unit 8, bring the wheel into its mounting position on the head of the spindle. After the mounting, the plate 10 is to be lowered for liberating the wheel, and after the balancing operation the plate 10 should be raised again for receiving the wheel and bringing the wheel out from the spindle for a subsequent lowering of the wheel.

Figure 2:
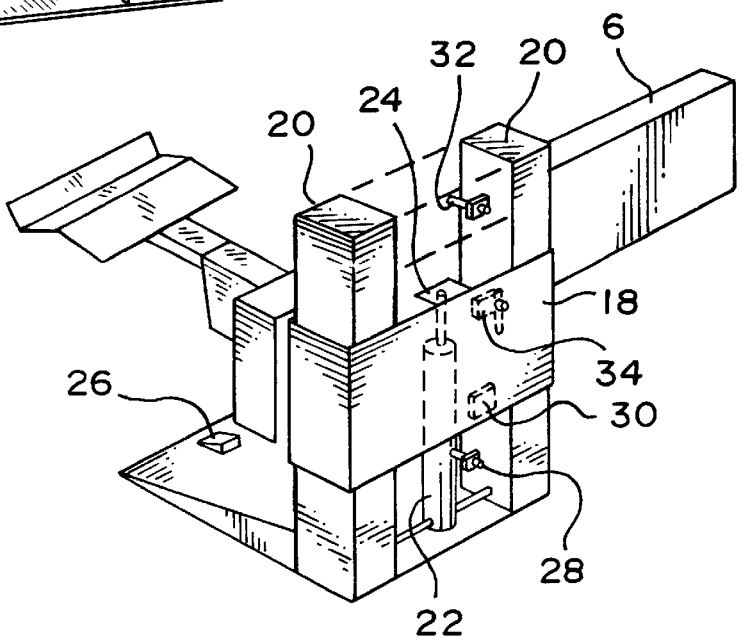
FIG. 2 is a schematic view seen from the rear.

As shown schematically in FIG. 2 the guiding frame member 6 is mounted on a lift frame 18 which, inside the housing 4, surrounds a pair of upright units 20, which are air containers in open connection with the lower end of a lift cylinder 22, the piston rod of which cooperates with a plate portion 24 on the frame 18.

At the front end of the base plate 2 a pedal switch 26 is mounted for use as described below. On one of the containers 20 or in any other stationary manner there is provided a lower sensor 28 cooperating with an actuator block 30 at the lower edge of the frame 18, and an upper sensor 32 cooperating with an upper actuator block 34, which may be height adjustably secured to the frame 18.

Figure 3:
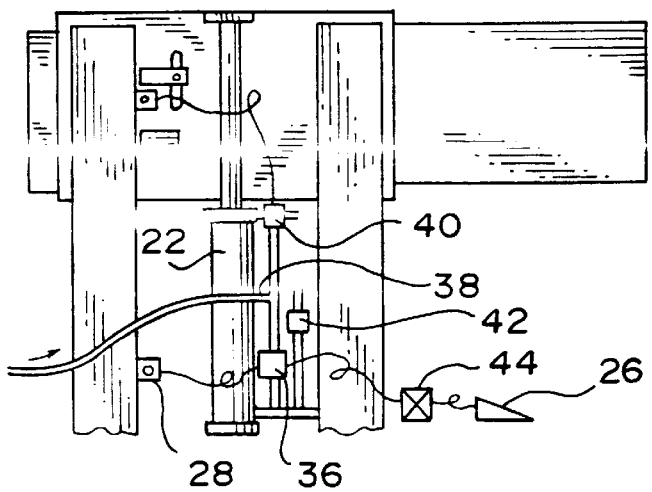
FIG. 3 is a plan view showing the control components used.

In FIG. 3 it is shown that the lower sensor is operatively connected with a solenoid valve 36, which receives compressed air through a supply line 38 for admission of compressed air to the bottom of the cylinder 22. The same supply line is connected to a solenoid valve 40 that is openable, controlled by the pedal switch 26, for supplying air to the top of the cylinder 22. The valve 40, when not actuated, assumes a bleeding position.

The valve 42 shown in FIG. 3 is a bleeding valve for bleeding the entire air system of the device.

When current and compressed air are connected to the described system the bottom sensor 28 will stand actuated for opening of the valve 36 and thus for introducing compressed air into the system. Hence, a pressure will be built up until it is sufficient for the cylinder 22 to raise the system 18,6,8,10. By this raising the lower actuator block 30 is moved upwardly from the sensor 28, which will thereby close the valve 36 and thus stop a further building up of pressure. The block 30 has a certain extension in the height direction, whereby the closing of the valve will be somewhat delayed, and the system is adapted in such a manner that by this delay there will be introduced just sufficient extra air to cause the lift system to rise to a position approximately at the middle of the height area, in which it can operate as weight independent. This requires a certain throttling of the inlet air, but that is easier than arranging for an electrical delay of the valve closure. The top sensor 32 will not be used in this initial phase.

When it is thereafter desired to pick up a wheel at the floor, the pedal switch 26 is actuated, whereby the top valve 40 is opened for admitting compressed air to the top of the cylinder 22. The lift system will thus be pressed down to its bottom position. Through a control circuit 44 the pedal switch is connected with the solenoid valve 36 such that it will now prevent the valve from admitting air to the bottom of the cylinder 22. Consequently, the plate 10 is lowered to a bottom position in which the wheel to be treated can easily be rolled, lifted or tilted onto the plate 10.

Then the wheel should be raised to the weight independent area, and this is effected by a renewed actuation of the pedal switch 26. The control circuit 44 is so adapted that by this subsequent actuation it will open the valve 36 and switch the top valve 40 to its bleeding position, whereby there is built up a pressure at the bottom of the cylinder 22, sufficient to raise the wheel, and the function will then be quite similar to the initial function, viz. that the system, though now loaded with a wheel, will be raised to the operative middle area by way of the bottom sensor 28 closing the inlet valve 36 when the lift system leaves this sensor.

Thereafter the raised wheel can be mounted on the spindle 16, and the operator again operates the pedal switch 26, which will now, via the unit 44, effect an opening of the top valve 40 for inlet of compressed air to the top of the cylinder 22. Then the lift system will be forced down until the bottom block 30 actuates the sensor 28 and thus causes the valve 40 to close.

After the balancing of the wheel a renewed actuation of the pedal switch will cause the valve 36 to open and the valve 40 to switch to bleeding, whereby the lift system is again raised, now into renewed contact with the wheel. The valve 36 closes by the lift system leaving the bottom position (sensor 28), but in this manner a small amount of additional air is introduced into the system so that the plate 10 will exert a certain additional pressure against the wheel. The wheel can now be released from the spindle 16 and drawn away by lateral displacement of the unit 8,10.

Due to the said additional pressure the plate 10, when the wheel is released, will be raised towards the top position, where the actuator block 34 will cause the bleeding valve 42 to open, such that the system will now again be lowered and the bleeding be stopped. Thereby the system will return to the middle of the weight independent range for the particular wheel, and by a following actuation of the pedal 26 the valve 40 is operated for pressing the system to its bottom position for removal of the wheel.

If the next wheel is of the same weight, the system will rise to the same position as before upon actuation of the pedal 26, and the procedure can be repeated. If the wheel is heavier, the system will remain for a short while in the bottom position, whereby the sensor 28 actuates the valve 36 for introduction of further air until the system starts rising, just as by the initial operation, such that the system will automatically adapt itself to the new weight. If the new wheel is lighter, the actuation of the pedal 26 will result in the system being sent to its top position, where the sensor 32 will react by effecting a bleeding to the extent that the system is lowered to the working level, i.e. again with automatic adaptation owing to the time of reaction of the system in connection with the valve actuation.

In particular when handling light wheels, e.g. for ordinary motor cars, it will be suitable to keep the wheels at an elevated working level, e.g. when using working tables and roller conveyors, so it may be desirable to let the lift system both receive and deliver the wheels in the top position of the system. The device may be used for this purpose without special modifications, as the pedal 26 may be operated for raising the lift system to the top, where the sensor 32 will cause the valve 36 to close and also keep the bleeding valve 42 closed. This position will be stable until a wheel is placed on the plate 10. The weight of the wheel will force the system down to the bottom position, from which a rising to the weight independent area will be effected just as described above, also here with automatic adaptation to the wheel weight.

When the wheel has been released from the balancing spindle, the pedal 26 should not be operated, as this would cause the lift system to move downwardly; instead the operator exerts a light manual pressure upwardly on the wheel or the plate 10, this being sufficient to move the system to the top position, because there has now—as described above—been established a certain additional pressure in the air system. During that raising the block 34 will pass the upper sensor 32 and thus via the valve 42 cause a certain bleeding of the overpressure. The remaining overpressure is sufficient to support the wheel in a non-floating manner in the top position.

When the wheel has been removed, the next wheel may be placed on the plate 10. If this wheel has the same weight as the former, it will be sufficient for the operator to apply a light downward push on the lift system to bring the latter past the top sensor 32, which will then again affect a brief bleeding and thereby relieve the remaining overpressure, such that the wheel moves directly down to the weight independent area.

If the next wheel is lighter, it will again be sufficient to press it slightly downwards, only until the bleeding sensor 32 is actuated; the bleeding will then go on until the system starts to move downwardly, again with the result that the wheel is automatically brought to the weight independent area.

If the next wheel is heavier, the wheel itself will cause the lift system to be pressed to the bottom, and the operator may then raise the wheel by operating the pedal 26, just as for a ground level pick-up.

The upper actuator block 34 is mounted in a height adjustable manner for enabling an adjustment of the effective top position of the lift system.

If work is going on with a series of wheels known to be of equal weight it will be advantageous to operate a non-illustrated switch which, after the weighing in of the first wheel, passivates the sensors 28 and 32 entirely. Now there will be the correct air filling in the system, and the lift system with associated wheels can be moved up and down by a light manual touch. Wheels can be collected and delivered in the high level without further measures, while for delivery in the low level it is required to pedal operate the top valve 40 in order to ensure that the carrier plate 10 will remain in the bottom position until it receives a new wheel, whereafter it is released by a following pedal operation. The said brief adjustments based on air intake and outlet will thus be avoided as superfluous in this situation.

I claim:

1. A device for temporarily supporting objects of different weights in a weight independent manner in balanced working positions within a specific range of working levels, comprising in combination:

a lift system for receiving an object in a loading level above said range of working levels and operable to carry out vertical movements between said loading level, said range of working levels and a bottom level therebeneath;

a pneumatic cylinder system supporting said lift system and comprising a control means for admission of compressed air and bleeding of air, respectively, said pneumatic cylinder system forming part of a voluminous air chamber system enabling said lift system to be moved through said range of working levels with an associated negligible change of air pressure in the air chamber system;

a first sensor means operable to detect a presence of said lift system in said bottom position, and in response to detection of said presence, for actuating said control means for admission of compressed air to said pneumatic cylinder system until the air pressure in said air chamber system is sufficient to effect raising of said lift system from said bottom position thereof, governed by the total weight of said lift system, said admission control means being de-actuated in response to raising of the lift system from said bottom position thereof, leaving an amount of introduced compressed air which is sufficient to raise the lift system to said range of working levels spaced above said bottom level of the lift system;

a second sensor means operable for detecting a presence of said lift system just below said upper loading level thereof, and in response to detection of the lift system being pressed downwardly from said upper loading level, for actuating a bleeding control means until the air pressure in said air chamber system is decreased sufficiently to produce a weight controlled lowering of said lift system to said range of working levels; and admission means operable for admitting air into said pneumatic cylinder system for urging said lift system to said upper loading level from said bottom position and from said range of working levels, respectively.

2. A device according to claim 1, wherein said admission means comprises an air supply valve operable to start supplying of compressed air to said pneumatic cylinder system in response to detection of the lift system in said bottom position by said first sensor means, said first sensor means being operatively connected with stop means for stopping the supply of compressed air in respnse to said first sensor means detecting passage of said lift system upwardly from said bottom position.

3. A device according to claim 2, wherein said stop means are actuated briefly after the lift system leaves said bottom position.

4. A device according to claim 3, wherein said stop means are actuated by said first sensor means detecting rising of the lift system from said bottom position.

5. A device according to claim 1, wherein said lift system is operatively connected with controllable pressure means for forcibly depressing the lift system from said range of working levels to said bottom position against the action of the air pressure in said pneumatic cylinder system and air chamber system.

6. A device according to claim 5, wherein said pneumatic cylinder system comprises a cylinder of the double acting type, said admission means and said controllable pressure means cooperating with a first end of said cylinder; and wherein said controllable pressure means are integrated with said cylinder and form a means for supplying compressed air to an opposite second end of the cylinder and for bleeding air from said opposite second end whenever the opposite second end is disconnected from a source of compressed air.

7. A device according to claim 5, wherein said control means comprise an actuator switch for alternatingly actuating said admission means and said controllable pressure means for effecting, respectively, raising and lowering of the lift system.

8. A device according to claim 7, wherein the actuator switch is a pedal system operable to effect switching in response to each actuation of a pedal member.

* * * * *